(12) United States Patent
Dubosc et al.

(10) Patent No.: US 8,922,389 B2
(45) Date of Patent: Dec. 30, 2014

(54) METHOD FOR COMMUNICATION BETWEEN AN EMITTING VEHICLE AND A TARGET

(75) Inventors: Christophe Dubosc, Villemomble (FR); Zdravko Zojceski, Courbevoie (FR)

(73) Assignee: Valeo Vision, Bobigny (FR)

( * ) Notice: Subject to any disclaimer, the term of this patent is extended or adjusted under 35 U.S.C. 154(b) by 219 days.

(21) Appl. No.: 13/156,700

(22) Filed: Jun. 9, 2011

(65) Prior Publication Data

US 2011/0305030 A1 Dec. 15, 2011

(30) Foreign Application Priority Data

Jun. 10, 2010 (FR) ...................... 10 54574

(51) Int. Cl.
*G08G 1/00* (2006.01)
*B60Q 1/46* (2006.01)
*H04B 10/114* (2013.01)
*H04B 10/116* (2013.01)

(52) U.S. Cl.
CPC .............. *B60Q 1/46* (2013.01); *H04B 10/1149* (2013.01); *H04B 10/116* (2013.01)
USPC ........... 340/902; 340/901; 340/903; 340/905; 340/933; 340/942; 340/425.5; 340/468; 340/469; 315/82; 362/464; 362/465; 362/466; 362/467

(58) Field of Classification Search
CPC .. B60Q 1/26; B60Q 2300/054; B60Q 1/0076; B60Q 1/0082; B60Q 1/02; B60Q 1/04; B60Q 1/14; B60Q 1/1492; B60Q 1/2603; B60Q 1/28; B60Q 1/46; B60Q 1/143; B60Q 1/44; B60Q 1/444; B60Q 1/1407; B60Q 1/50; B60Q 2300/142; B60Q 2300/21; B60Q 2300/41; B60Q 2300/43; B60Q 2400/30
USPC ............................ 362/464–466, 467; 315/82; 340/901–905, 933–943, 425.5–426.36, 340/438–462, 468–479
See application file for complete search history.

(56) References Cited

U.S. PATENT DOCUMENTS

| 3,986,022 | A | * | 10/1976 | Hyatt | 250/205 |
| 4,286,308 | A | * | 8/1981 | Wolff | 362/465 |
| 4,684,918 | A | * | 8/1987 | Solomon | 340/475 |
| 5,347,261 | A | * | 9/1994 | Adell | 340/469 |
| 5,581,235 | A | * | 12/1996 | Hollstein | 340/477 |
| 6,239,701 | B1 | * | 5/2001 | Vasquez et al. | 340/539.32 |
| 6,496,100 | B1 | * | 12/2002 | Hiebl | 340/5.31 |
| 6,700,327 | B2 | * | 3/2004 | Leleve et al. | 315/80 |
| 6,765,495 | B1 | * | 7/2004 | Dunning et al. | 340/903 |

(Continued)

FOREIGN PATENT DOCUMENTS

| DE | 102006058156 A1 | 6/2008 |
| EP | 2026097 A1 | 2/2009 |
| FR | 2921601 A3 | 4/2009 |

*Primary Examiner* — Steven Lim
*Assistant Examiner* — Ryan Sherwin
(74) *Attorney, Agent, or Firm* — Jacox, Meckstroth & Jenkins

(57) ABSTRACT

A system and method for communication between an emitting motor vehicle (Ve) and at least one target, the emitting vehicle (Ve) including at least one light device, the method comprising the step of automatically modulating a light signal (S) emitted by the light device for a communication between the vehicle (Ve) and the target; and the light device being chosen from: a lighting device, a daytime running light (DRL), a position light.

16 Claims, 6 Drawing Sheets

(56) References Cited

U.S. PATENT DOCUMENTS

Figure 1:
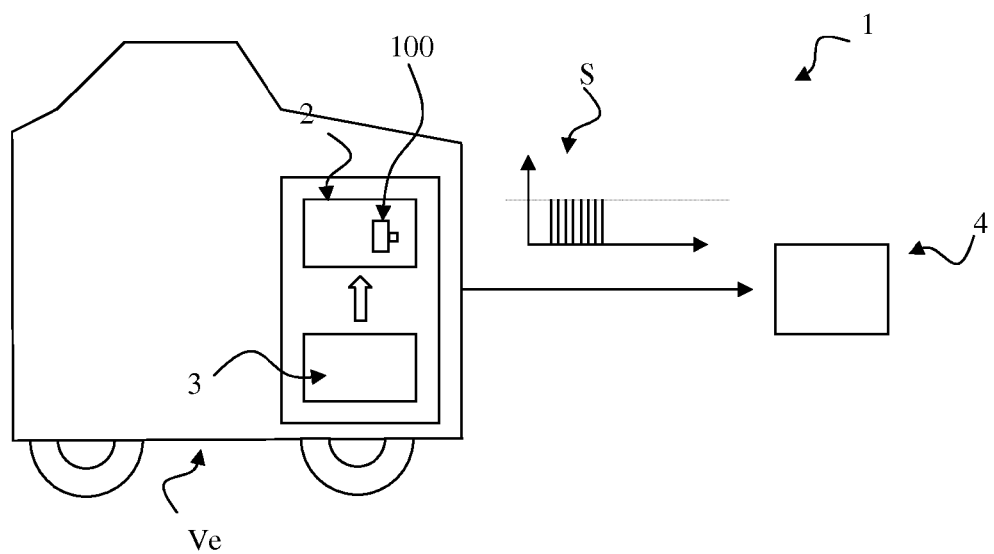

| | | | |
|---|---|---|---|
| 6,822,563 B2 * | 11/2004 | Bos et al. | 340/461 |
| 7,004,606 B2 * | 2/2006 | Schofield | 362/460 |
| 7,190,260 B2 * | 3/2007 | Rast | 340/479 |
| 7,352,278 B2 * | 4/2008 | Terzian | 340/471 |
| 8,384,289 B2 * | 2/2013 | Thomas | 315/82 |
| 8,436,747 B2 * | 5/2013 | Schoepp | 340/903 |
| 2006/0164226 A1 * | 7/2006 | Hartle | 340/457 |
| 2007/0057806 A1 | 3/2007 | Nelson | |
| 2007/0242337 A1 * | 10/2007 | Bradley | 359/237 |
| 2009/0072996 A1 | 3/2009 | Schoepp | |

* cited by examiner

METHOD FOR COMMUNICATION BETWEEN AN EMITTING VEHICLE AND A TARGET

CROSS-REFERENCE TO RELATED APPLICATIONS

This application claims priority to French Application No. 1054574 filed Jun. 10, 2010, which application is incorporated herein by reference and made a part hereof.

BACKGROUND OF THE INVENTION

1. Field of the Invention

The invention relates notably to a method for communication between an emitting motor vehicle and a target.

2. Description of the Related Art

It is commonplace to make headlight calls, for example to warn other drivers of a hazard, by rapidly and manually switching on and off, a certain number of times, the road lighting (or headlight).

In the automotive domain, numerous lighting devices use halogen or discharge lamps, notably of Xenon type.

On these devices, the headlight call usually presents the following drawbacks.

The rise time when a Xenon lamp is switched on may be relatively lengthy, which does not make it possible to make headlight flashes that are as close together as would be desired.

The rise and fall time, above all when cold, for a halogen lamp is also relatively lengthy, which raises the same type of problem as mentioned above.

Furthermore, on this type of halogen and Xenon lamps, it is difficult to provide an additional light intensity, namely a light intensity greater than the normal operating intensity.

Finally, repeated headlight calls greatly reduce the life of the lamps.

Moreover, there is a need to communicate easily, for example, between two vehicles.

SUMMARY OF THE INVENTION

The aim of the invention is notably to overcome the above-mentioned drawbacks.

Thus, the subject of the invention is a method for communication between an emitting motor vehicle and at least one target, the emitting vehicle including at least one light device, the method comprising the following step:

automatically modulating a light signal emitted by the light device for a communication between the vehicle and the target.

According to the invention, the light device is preferentially chosen from: a lighting device such as a low beam, high beam or fog beam, or, as a variant, a signalling device such as a daytime running light (DRL) or a position light.

By virtue of the invention, the communication with, for example, another vehicle, can be conducted without hindrance to the driver of the emitting vehicle.

This may be particularly advantageous in the case of a headlight call, for example, because the light pulses for this headlight call can be generated automatically, without the driver having to carry out complicated movements with his fingers which may hamper the driving.

The invention thus makes it possible to enhance safety during driving.

Preferentially, the light device comprises at least one light-emitting diode arranged to participate in the modulated light signal.

The invention thus offers various advantages.

For example, it is possible to exploit, for the implementation of the invention, the presence of light-emitting diodes (LEDs) and an associated control device that are already present on the vehicle.

Furthermore, a light-emitting diode has a rise time when switched on and a fall time when switched off that are very short compared, notably, to a halogen or discharge lamp.

Finally, an LED makes it possible to produce frequent bursts of light pulses without degrading its life, unlike, for example, a halogen lamp or a discharge lamp.

Advantageously, the modulated light signal from the light device is arranged to be perceptible to the human eye.

If necessary, the wavelength of the modulated light signal duly produced by the light device is chosen to be in the visible domain of the light spectrum.

In an exemplary implementation of the invention, the modulated light signal is modulated in light intensity, notably in a periodic manner.

Advantageously, the duly modulated light signal comprises a train of light pulses, notably of periodic light pulses of constant or progressive period, the number of pulses being, for example, between 1 and 10 per pulse train.

Preferentially, the time between two consecutive light intensity maxima is between 100 ms and 300 ms.

In an exemplary implementation of the invention, the light device is arranged to fulfill a predetermined regulatory photometric function such as road lighting, dipped lighting, a daytime running light (DRL), a position light, fog lighting.

The modulated light signal corresponds, in this case, to the modulation, for example in light intensity, of the predetermined photometric function.

If desired, the light signal is modulated so as to reach light intensity values greater than the nominal light intensity value of the associated photometric function.

Advantageously, the photometric function associated with the light device corresponds to a road lighting.

In another exemplary implementation of the invention, the light device is arranged so as to participate only in the emission of the modulated light signal, without producing any regulatory photometric function.

In an exemplary implementation of the invention, the modulated light signal has a maximum intensity that is high enough for the modulated light signal to be able to be differentiated from the ambient brightness and low enough not to be a nuisance to a person in the vicinity of the emitting vehicle.

The maximum intensity of the modulated light signal is preferentially high enough for this signal to be able to be differentiated from the regulatory photometric functions of the vehicle.

In an exemplary implementation of the invention, the automatic modulation of the light signal is generated by the light device, without the help of any mobile mechanism.

For example, the modulation of the light signal is generated electronically, notably using a microcontroller or a computer driver.

In another exemplary implementation of the invention, the modulated light signal is arranged to be imperceptible to the human eye.

For example, the light signal is modulated according to a frequency that is high enough to make the variations of its intensity invisible to the human eye.

If appropriate, the amplitude variations of the light signal are low enough for them to be imperceptible to the human eye.

If desired, the modulated light signal has a wavelength outside the visible domain of the light spectrum.

If appropriate, the target of the communication includes at least one photosensitive electronic sensor, capable of receiving the modulated light signal.

In an exemplary implementation of the invention, the target of the communication is a third-party vehicle, notably situated in the vicinity of the emitting vehicle.

In another exemplary implementation of the invention, the target of the communication is a fixed installation, such as a terminal or a relay, for example, installed on the side of a road.

If desired, the emitting vehicle includes a photosensitive electronic sensor arranged to receive a modulated light signal emitted, for a communication, by a light device of a third-party vehicle or of a fixed installation.

If appropriate, the communication is both uplink and downlink, the emitting vehicle and the target being both emitter and receiver.

Advantageously, the modulated light signal is arranged to carry at least one information item, notably binary, and the photosensitive electronic sensor of the target is linked to a processing unit capable of processing this information item.

For example, the information item carried by the modulated light signal relates:

to the environment of the emitting vehicle, for example to the traffic condition around the emitting vehicle or to climatic conditions;

to the state of the emitting vehicle, for example a failure state of the vehicle; and to a message, for example a personal message.

In an exemplary implementation of the invention, the emission of the modulated light signal is triggered by a manual control device, that is to say, a device that can be controlled by a person. A manual control device may, if appropriate, signify a device that can be controlled by the voice of a person.

The manual control device may be a device internal to the vehicle chosen from the following nonlimiting list:
a pedal;
a hand lever;
a knob;
a handle;
a lever;
a slider;
a control wheel; and
a touch screen.

In another exemplary implementation of the invention, the control device may be external to the vehicle and chosen from the following nonlimiting list:
a remote control;
a telephone;
a PDA/smartphone; and
a computer.

In another exemplary implementation of the invention, the emission of the modulated light signal is triggered by an automatic control device.

If appropriate, the automatic control device is arranged to process an information item concerning the environment of the vehicle, such as, for example, the presence of an accident on the road.

This information concerning the environment of the vehicle may be obtained by an acquisition device, chosen for example from the following nonlimiting list:
a sensor such as, for example, a CCD;
an infrared detector;
one or more photodiodes;
a geolocation system;
an accelerometer;
a vehicle speed measurement system;
a goniometer; and
an LED.

The subject of the invention is also a system for communication between an emitting motor vehicle and a target, this system comprising:
at least one light device; and
a modulation device for automatically modulating the light signal emitted by the light device for a communication between the vehicle and the target.

The invention can be better understood from reading the following detailed description of nonlimiting exemplary implementations of the invention, and from studying the appended drawing, in which:

BRIEF DESCRIPTION OF THE ACCOMPANYING DRAWINGS

Figure 2:
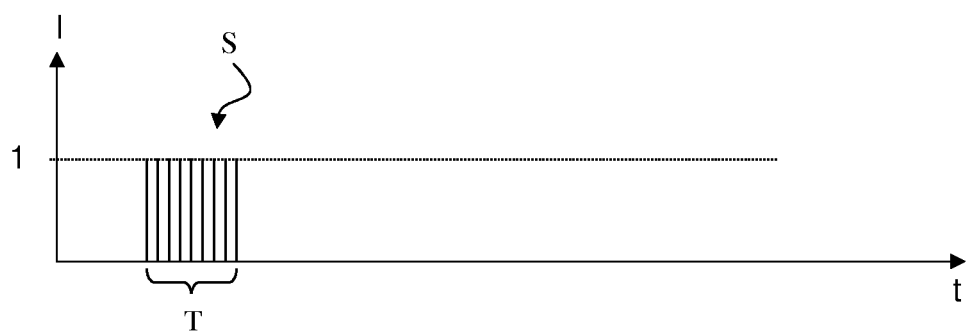
Figure 3:
Figure 4:
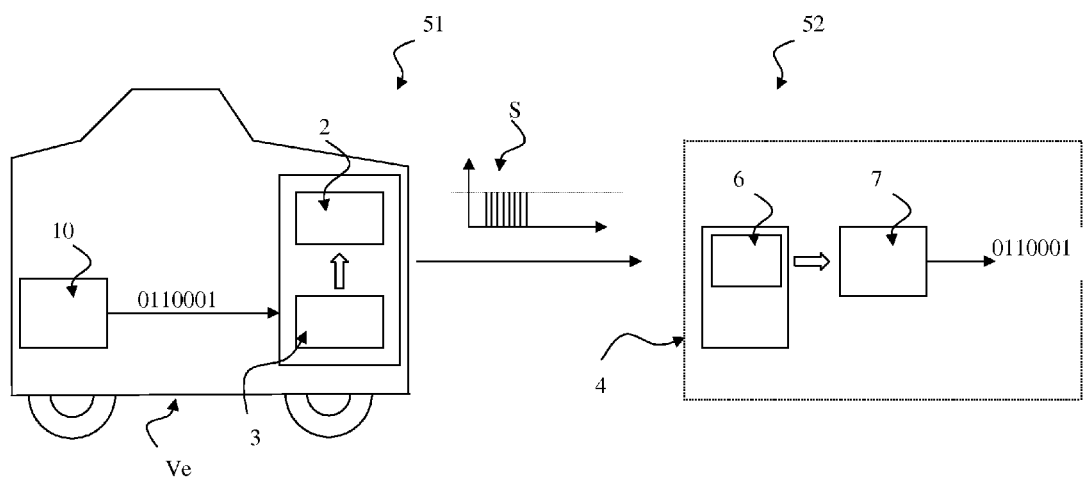
Figure 5:
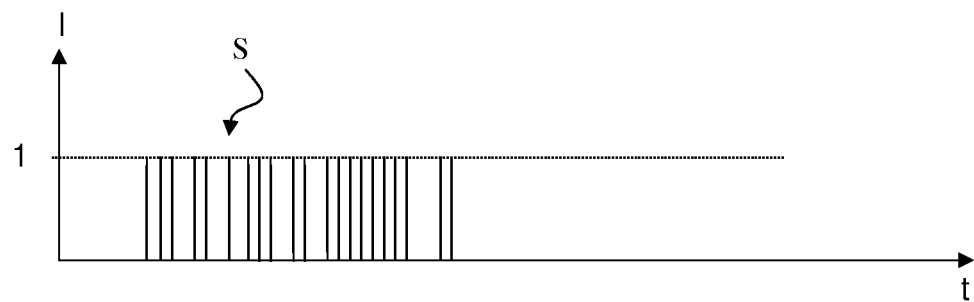
Figure 6:
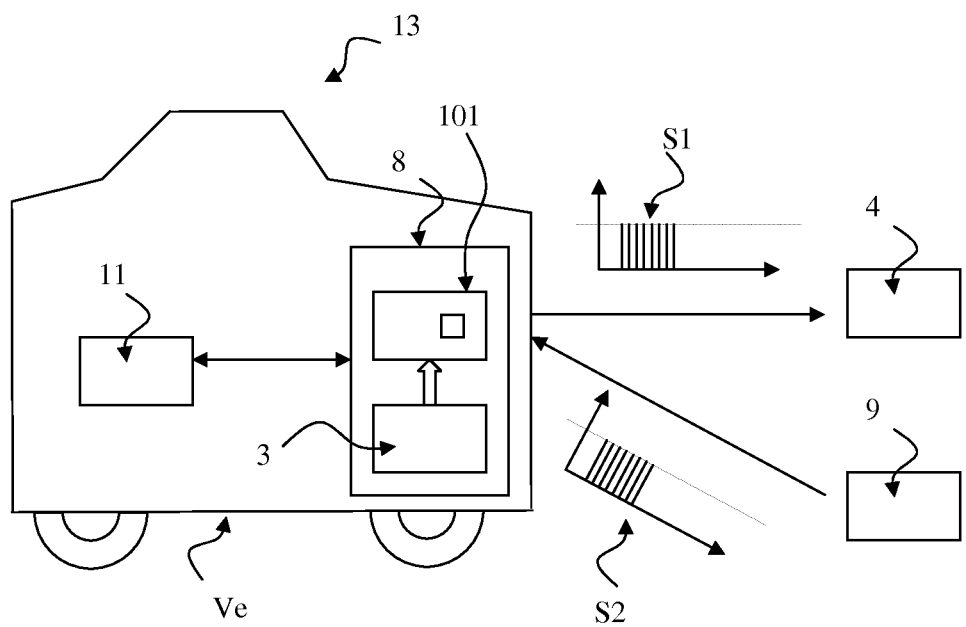
Figure 7:
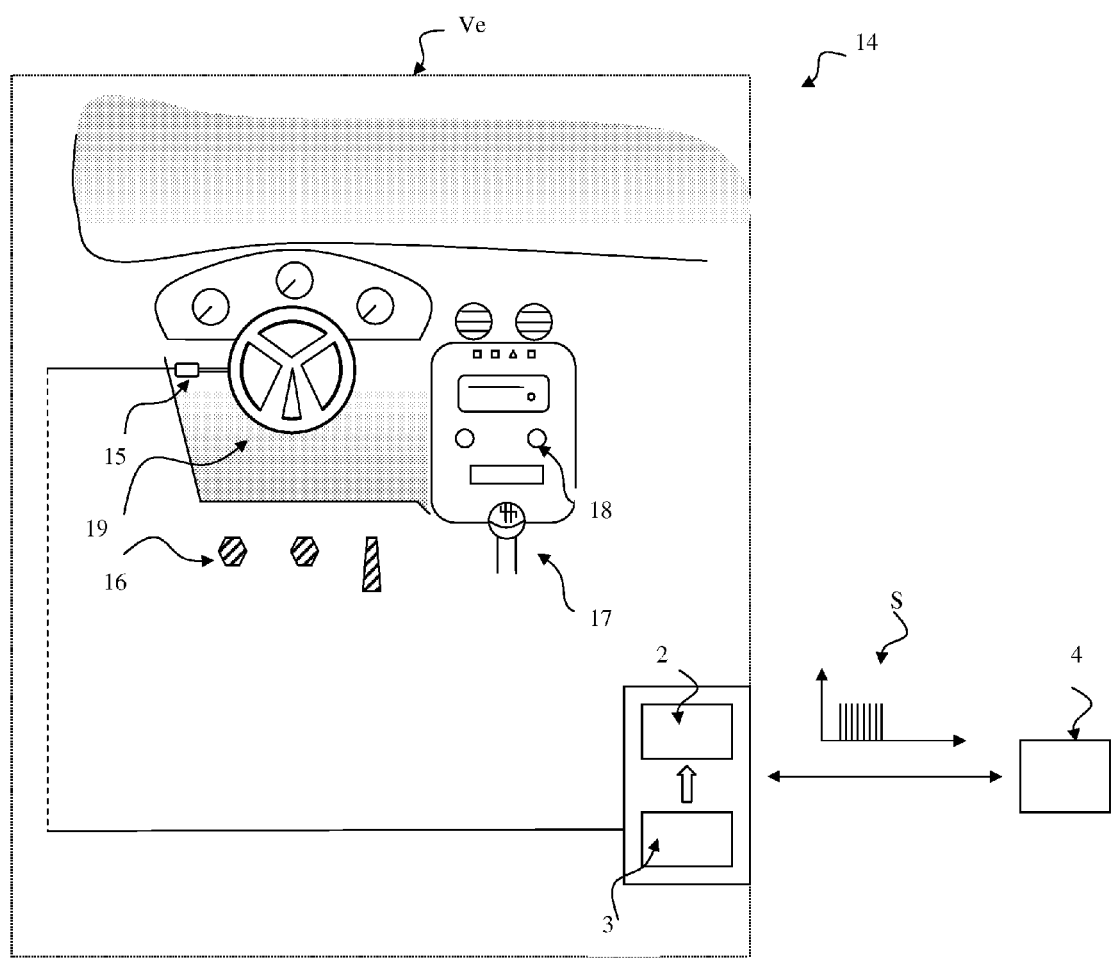
Figure 8:
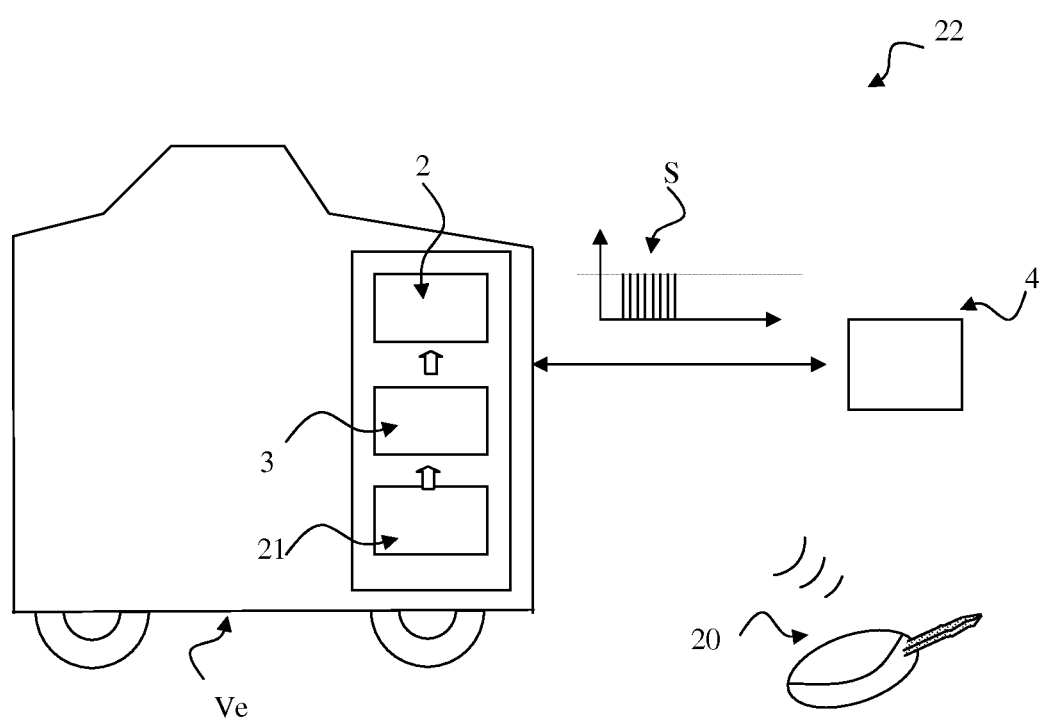
Figure 9:
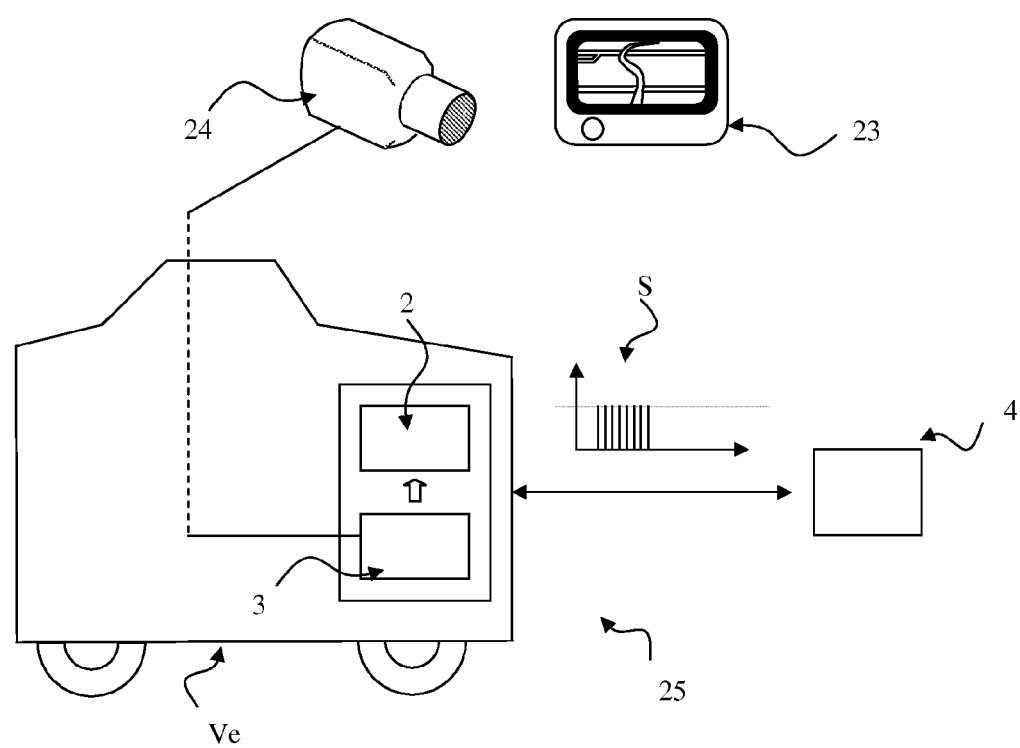

FIG. 1 schematically and partially represents a communication system according to an exemplary implementation of the invention;

FIG. 2 schematically and partially represents a timing diagram of a light signal emitted within the system of FIG. 1;

FIG. 3 schematically and partially represents a timing diagram of a light signal emitted in extra-intensity mode within the system of FIG. 1;

FIG. 4 schematically and partially represents a communication system using binary data, according to another exemplary implementation of the invention;

FIG. 5 schematically and partially represents a timing diagram of a light signal emitted in the system of FIG. 4;

FIG. 6 schematically and partially represents an emitter-receiver communication system according to another exemplary implementation of the invention; and FIGS. 7, 8 and 9 schematically and partially represent various control devices of a communication system according to exemplary implementations of the invention

DETAILED DESCRIPTION OF THE PREFERRED EMBODIMENTS

FIG. 1 represents a communication system 1 according to an exemplary implementation of the invention, this system 1 being mounted on an emitting vehicle Ve and enabling communication between the emitting vehicle Ve and a target 4.

This system 1 comprises:
a light device 2, capable of emitting a light signal S; and
a modulation device 3, for automatically modulating the light signal S.

The target 4 is, in the example described, a road user, for example a pedestrian or a driver of another vehicle.

The light device 2 comprises at least one LED 100.

This light device 2 is arranged to produce a regulatory 'road lighting' photometric function.

The automatic modulation device 3 is, for example, a microcontroller or a driver.

The automatic modulation device 3 makes it possible to modulate a light signal emitted by the light device 2 in the manner described in FIG. 2.

As can be seen, the modulated light signal S comprises a train T of periodic light pulses, comprising, for example, 9 pulses, the period of the pulses of the train T being, for example, equal to 200 ms.

The maximum light intensity of the modulated light signal, in the example described, is substantially equal to that of the 'road lighting' function produced by the light device 3.

As a variant, as can be seen in FIG. 3, the maximum intensity of the light signal is greater than that of the 'road lighting' function.

For example, this maximum intensity is equal to 1.5 times that of the 'road lighting' function.

In the example that has just been described, the communication system 1 makes it possible to produce a signal headlight call S by automatically modulating the road lighting.

FIG. 4 represents a first communication system 51, mounted on an emitting vehicle Ve, and a second communication system 52, mounted on a target 4, according to another exemplary implementation of the invention.

The systems 51 and 52 allow communication between the emitting vehicle Ve and the target 4.

In the example described, the target 4 is a third-party vehicle or a fixed installation.

The first communication system 51 comprises:
a light device 2, capable of emitting a light signal S;
a modulation device 3, for automatically modulating the light signal S; and
a control unit 10, linked to the modulation device 3.

The light device 2 comprises at least one LED, not represented here.

The light device 2 is arranged to produce a modulated light signal S whose optical characteristics differ from any regulatory photometric function.

The wavelength of the light signal S is outside the visible spectrum of light, making this signal S imperceptible to the human eye.

The control unit 10 is arranged to generate binary information relating to the environment of the emitting vehicle, such as, for example, the road traffic condition, intended for the target 4.

The second communication system 52 comprises:
a photosensitive electronic sensor 6, capable of receiving the modulated light signal S; and
a processing unit 7, linked to the sensor 6.

The photosensitive electronic sensor 6 is, for example, a camera or a photodiode 6.

The processing unit 7 is arranged to process the modulated light signal S in order to decode the information generated by the control unit 10 of the emitting vehicle Ve.

This processing unit 7 is, for example, a demodulator associated with a decoder.

The automatic modulation device 3 modulates a light signal emitted by the light device 2, according to the binary information produced by the control unit 10, in the manner described in FIG. 5.

As can be seen in this figure, the modulated light signal S comprises a train of light pulses.

The modulation is paced at a frequency that is high enough, for example approximately 1000 Hz, to make it imperceptible to the human eye.

In the example described, the modulation used is an all-or-nothing modulation, also called 'On-Off Keying', in which each information bit generated by the control unit 10 is transmitted without being coded.

As a variant, other modulations may be used, in conjunction with correcting or compressing coding units.

In the example that has just been described, the communication systems 51 and 52 make it possible to transmit the binary information by automatically modulating a light signal emitted by the emitting vehicle Ve.

FIG. 6 represents a communication system 13 mounted on a vehicle Ve, according to another exemplary implementation of the invention.

The communication system 13 allows for an uplink communication between the vehicle Ve and a target 4 and a downlink communication between the vehicle Ve and the third-party emitter 9.

The communication system 13 comprises:
a light device 8, capable of emitting a light signal S1 and of receiving a light signal S2;
a modulation device 3, for automatically modulating the light signal S1; and
a processing unit 11 linked to the modulation device 3.

In the example described, the third-party emitter 9 and/or the target 4 are mounted on third-party vehicles or fixed installations.

The third-party emitter 9 is capable of emitting a modulated light signal S2, carrying an information item intended for the emitting vehicle Ve.

The light device 8 comprises at least one LED, not represented here, and at least one photosensitive electronic sensor 101, for receiving the signal S2.

The light device 8 may be arranged to produce a modulated light signal S1 whose optical characteristics differ from any regulatory photometric function.

The wavelength of the light signal S1 may be outside the visible spectrum of light, making this signal S1 imperceptible to the human eye.

The processing unit 11 is arranged to:
generate binary information relating to the environment of the emitting vehicle, such as, for example, the road traffic condition, intended for the target 4; and
processing the modulated light signal S2 received in order to decode the information transmitted by the third-party emitter 9.

This processing unit 11 is, for example, a coder/decoder.

In the example that has just been described, the communication system 13 enables binary information to be transmitted to a target 4 by automatically modulating a light signal emitted by the emitting vehicle Ve and/or binary information transmitted by a third-party emitter 9 to be received and processed.

Advantageously, the target 4 and the third-party emitter 9 are incorporated in one and the same communication system, this communication system being, for example, mounted on another vehicle.

The invention therefore allows, in this case, an uplink and downlink communication between the two vehicles in order to improve driving and road safety.

FIG. 7 represents a communication system 14 mounted on a vehicle Ve, according to another exemplary implementation of the invention.

The system 14 allows for a manually triggered communication, between the emitting vehicle Ve and the target 4.

In the example described, the target 4 is a third-party vehicle or a fixed installation.

The communication system 14 comprises:
a light device 2, capable of emitting a light signal S;
a modulation device 3, for automatically modulating the light signal S; and
a manual control device, mounted in the passenger compartment of the emitting vehicle Ve.

The manual control device is chosen from the following list: a button 18, a hand lever 15, pedals 16, a lever 17 or a control wheel 19.

The emission of the modulated light signal S is triggered as soon as the manual control device is activated.

In the example that has just been described, the communication system 14 allows for an automatic headlight call to be made, manually triggered, for example when a dedicated button is activated.

The invention is not limited to the manual control devices described above.

For example, FIG. 8 represents a communication system 22 mounted on an emitting vehicle Ve.

This communication system 22 is identical to the communication system 14 represented in FIG. 7, apart from the fact that the manual control device 20 is hand-held and that a signal acquisition device 21 is provided in the emitting vehicle Ve.

The manual control device 20 is, for example, a remote control 20, which can be used to remotely open the doors of the emitting vehicle Ve.

The signal acquisition device 21 is capable of receiving a signal from the manual control device 20 and thus of triggering, upon the detection of this signal, the emission of the modulated light signal S.

This makes it possible, for example, for the owner of the vehicle to easily identify his vehicle, for example in a car park.

In the example that has just been described, the communication system 22 can be triggered from outside the passenger compartment of the vehicle Ve.

FIG. 9 represents a communication system 25 mounted on an emitting vehicle Ve, according to another exemplary embodiment of the invention.

The communication system 25 is identical to the communication system 14 represented in FIG. 7, apart from the fact that the associated control device is automatic.

The automatic control device is arranged to process information concerning the environment of the vehicle, such as, for example, the presence of an accident on the road.

This information concerning the environment of the vehicle may be obtained by an acquisition device, such as a geolocation system 23 or a camera 22.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for communication between an emitting motor vehicle (Ve) and at least one target, the emitting motor vehicle (Ve) including at least one light device, the method comprising the following step:
    automatically modulating a light signal emitted by the at least one light device to provide a modulated light signal (S) for a communication between the emitting motor vehicle (Ve) and the at least one target, wherein said modulated light signal comprises a train of periodic light pulses, a number of said periodic light pulses being between 1 and 10 per pulse train;
    the at least one light device being chosen from: a lighting device, a daytime running light (DRL), and a position light;
    triggering said automatic modulating step in response to an activation of a manual control device by an operator of the emitting motor vehicle (Ve);
    wherein the modulated light signal (S) is arranged to be perceptible to the human eye;
    wherein the at least one light device is arranged to fulfill a predetermined regulatory photometric function, said photometric function being a headlamp function chosen from:
    a high beam;
    a low beam;
    a DRL light (Daytime Running Light); or
    a fog beam; and
    the modulated light signal corresponding to the modulation of the predetermined regulatory photometric function, wherein the predetermined regulatory photometric function comprises a road lighting function;
    wherein a light intensity of said light signal is substantially equal to that of said road lighting function produced by said at least one light device before said light signal is modulated and said modulated light signal causes said at least one light device to provide a modulated light intensity that is greater than said light intensity in response to said triggering step;
    wherein a time between two consecutive pulses is between 100 ms and 300 ms.

2. The method according to claim 1, wherein the at least one light device comprises at least one light-emitting diode arranged to participate in the modulated light signal (S).

3. The method according to claim 2, wherein the at least one light device is capable of producing a road lighting and that the modulated light signal (S) corresponds to the modulation of said road lighting.

4. The method according to claim 2, wherein the at least one target includes at least one photosensitive electronic sensor, arranged to receive the modulated light signal (S).

5. The method according to claim 2, wherein the emitting motor vehicle (Ve) includes a photosensitive electronic sensor arranged to receive a modulated light signal (S2) emitted by a lighting and/or signalling device of a third-party vehicle.

6. The method according to claim 1, wherein the at least one light device is capable of producing a road lighting and that the modulated light signal (S) corresponds to the modulation of said road lighting.

7. The method according to claim 1, wherein the at least one target includes at least one photosensitive electronic sensor, arranged to receive the modulated light signal (S).

8. The method according to claim 1, wherein the emitting motor vehicle (Ve) includes a photosensitive electronic sensor arranged to receive a modulated light signal (S2) emitted by a lighting and/or signalling device of a third-party vehicle.

9. The method according to claim 1, wherein the modulated light signal (S) is arranged to carry at least one information item that is binary.

10. The method according to claim 9, wherein the at least one information item carried by the modulated light signal (S) relates to at least one of a traffic condition around the emitting motor vehicle (Ve), to the state of the emitting motor vehicle (Ve), or to a message.

11. The method according to claim 10, wherein the emission of the modulated light signal (S) is generated by an automatic control device.

12. A system for communication between an emitting motor vehicle (Ve) and a target, this system comprising:
    at least one light device for generating a light signal;
    a modulation device to provide a modulated light signal (S) for automatically modulating said light signal emitted by said at least one light device for a communication between the emitting motor vehicle (Ve) and the target, wherein said modulated light signal (S) comprises a train of periodic light pulses, a number of said periodic pulses being between 1 and 10 per pulse train;

wherein said modulated light signal (S) is arranged to be perceptible to the human eye;

wherein said at least one light device is arranged to fulfill a predetermined regulatory photometric function, said photometric function being a headlamp function chosen from:

a high beam;
a low beam;
a DRL (Daytime Running Light); or
a fog beam;

said modulated light signal (S) corresponding to the modulation of said predetermined regulatory photometric function, wherein the predetermined regulatory photometric function comprises a road lighting function; and a manual control device coupled to said modulation device for triggering said modulation device in response to a manual triggering of said manual control device by an operator of said emitting motor vehicle (Ve);

wherein a light intensity of said light signal is substantially equal to that of said road lighting function produced by said at least one light device before said light signal is modulated and said modulated light signal causes said at least one light device to provide a modulated light intensity that is greater than said light intensity in response to said manual triggering of said manual control device;

wherein a time between two consecutive pulses is between 100 ms and 300 ms.

13. The system according to claim 12, wherein the at least one light device is capable of producing a road lighting and that the modulated light signal (S) corresponds to the modulation of said road lighting.

14. The system according to claim 12, wherein the at least one target includes at least one photosensitive electronic sensor, arranged to receive the modulated light signal (S).

15. The system according to claim 12, wherein the emitting motor vehicle (Ve) includes a photosensitive electronic sensor arranged to receive a modulated light signal (S2) emitted by a lighting and/or signalling device of a third-party vehicle.

16. The system according to claim 12, wherein said manual control device is at least one of a button, a hand lever, pedals, a lever or a control wheel.

* * * * *